(12) United States Patent
Sagara

(10) Patent No.: US 12,481,109 B2
(45) Date of Patent: Nov. 25, 2025

(54) OPTICAL CIRCUIT BOARD AND ELECTRONIC COMPONENT MOUNTING STRUCTURE USING THE SAME

(71) Applicant: KYOCERA Corporation, Kyoto (JP)

(72) Inventor: Akifumi Sagara, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 309 days.

(21) Appl. No.: 18/274,662

(22) PCT Filed: Jan. 20, 2022

(86) PCT No.: PCT/JP2022/001902
§ 371 (c)(1),
(2) Date: Jul. 27, 2023

(87) PCT Pub. No.: WO2022/163481
PCT Pub. Date: Aug. 4, 2022

(65) Prior Publication Data
US 2024/0094485 A1  Mar. 21, 2024

(30) Foreign Application Priority Data
Jan. 29, 2021 (JP) .................. 2021-012621

(51) Int. Cl.
*H04B 10/00* (2013.01)
*G02B 6/42* (2006.01)

(52) U.S. Cl.
CPC ......... *G02B 6/4228* (2013.01); *G02B 6/4245* (2013.01); *G02B 6/428* (2013.01); *G02B 6/4238* (2013.01)

(58) Field of Classification Search
CPC .... G02B 6/4228; G02B 6/4245; G02B 6/428; G02B 6/4238; G02B 6/138; G02B 6/4204;
(Continued)

(56) References Cited

U.S. PATENT DOCUMENTS 6,594,426 B1 * 7/2003 Kwon ................ G02B 6/30
385/52
7,881,580 B2 * 2/2011 Watanabe ........... G02B 6/4227
385/91
(Continued)

FOREIGN PATENT DOCUMENTS

JP  3557161 B2 * 8/2004
JP  2007-003722 A  1/2007
(Continued)

*Primary Examiner* — Agustin Bello
(74) *Attorney, Agent, or Firm* — Volpe Koenig

(57) ABSTRACT

An optical circuit board of the present disclosure includes a wiring board and an optical waveguide. The wiring board includes a mounting region for an optical component on an upper surface of the wiring board. The optical waveguide is located in a region adjacent to the mounting region, and includes, over the upper surface of the wiring board, a lower cladding layer, a plurality of cores extending in a first direction, and an upper cladding layer in this order, and is provided with alignment marks on the lower cladding layer. The lower cladding layer includes a first region in which the plurality of cores are located, and two second regions located facing the first region across a groove at positions between which the plurality of cores are sandwiched. The optical waveguide includes a first surface facing the mounting region, and end surfaces of the plurality of cores are exposed thereon.

7 Claims, 3 Drawing Sheets

(58) Field of Classification Search
CPC ........ G02B 6/4224; G02B 6/26; G02B 6/122; H05K 1/0274
See application file for complete search history.

(56) References Cited

U.S. PATENT DOCUMENTS

| | | | | |
|---|---|---|---|---|
| 8,606,063 | B2* | 12/2013 | Tsujita | G02B 6/1221 427/163.2 |
| 10,361,787 | B2* | 7/2019 | Mack | G02B 6/4213 |
| 2005/0123246 | A1* | 6/2005 | Morse | H01S 3/06704 385/39 |
| 2007/0009199 | A1 | 1/2007 | Yokino et al. | |
| 2007/0058904 | A1* | 3/2007 | Ban | G02B 6/4204 385/52 |
| 2007/0253670 | A1* | 11/2007 | Watanabe | G02B 6/136 385/132 |
| 2007/0274653 | A1* | 11/2007 | Watanabe | G02B 6/4228 385/129 |
| 2008/0008419 | A1* | 1/2008 | Krahenbuhl | G02B 6/32 385/33 |
| 2008/0232736 | A1* | 9/2008 | Kitoh | G02B 6/122 385/14 |
| 2008/0304802 | A1* | 12/2008 | Watanabe | G02B 6/4227 385/134 |
| 2009/0304324 | A1* | 12/2009 | Kim | G02B 6/43 385/14 |
| 2010/0065309 | A1* | 3/2010 | Shioda | H05K 1/0274 29/829 |
| 2010/0074585 | A1* | 3/2010 | Shimizu | G02B 6/4224 264/1.24 |
| 2012/0195562 | A1* | 8/2012 | Tsujita | G02B 6/138 427/163.2 |
| 2013/0163916 | A1* | 6/2013 | Kim | G02B 6/12004 438/31 |
| 2015/0093515 | A1* | 4/2015 | Subbaraman | G02F 1/065 427/492 |
| 2016/0170158 | A1* | 6/2016 | Zheng | G02B 6/14 438/27 |
| 2016/0202420 | A1* | 7/2016 | Paquet | G02B 6/30 385/36 |
| 2016/0274317 | A1* | 9/2016 | Tsujita | G02B 6/4214 |
| 2020/0132929 | A1* | 4/2020 | Vashishtha | G02B 6/12016 |
| 2024/0094485 | A1* | 3/2024 | Sagara | G02B 6/428 |

FOREIGN PATENT DOCUMENTS

| | | | | |
|---|---|---|---|---|
| JP | 2008-216905 | A | 9/2008 | |
| JP | 2012-155215 | A | 8/2012 | |
| JP | 2014-038174 | A | 2/2014 | |
| WO | WO-2022163481 | A1 * | 8/2022 | ............... G02B 6/26 |
| WO | WO-2022210230 | A1 * | 10/2022 | ............... H05K 1/02 |

* cited by examiner

OPTICAL CIRCUIT BOARD AND ELECTRONIC COMPONENT MOUNTING STRUCTURE USING THE SAME

TECHNICAL FIELD

The present invention relates to an optical circuit board and an electronic component mounting structure using the same.

BACKGROUND OF INVENTION

In recent years, optical fibers that allow high speed communication of enormous amounts of data have been used for telecommunications. Transmission and reception of optical signals are performed, for example, between an optical fiber and an optical component (silicon photonics device). Thus, the optical component needs to be accurately mounted on an optical circuit board including an optical waveguide to which the optical fiber is connected. For this reason, alignment marks are used, as disclosed in Patent Document 1.

Typically, end surfaces of cores (members included in the optical waveguide) facing a light receiving/emitting portion of the optical component are processed by dicing. If the position where processing is performed by dicing is shifted, the positional accuracy of the optical component and the cores decreases. This may increase an optical loss between the optical component and the cores.

CITATION LIST

Patent Literature

Patent Document 1: JP 2012-155215 A

SUMMARY

Solution to Problem

An optical circuit board according to the present disclosure includes a wiring board including an upper surface and an optical waveguide located over the upper surface. The wiring board includes a mounting region for an optical component on the upper surface. The optical waveguide is located in a region adjacent to the mounting region, includes, over the upper surface, a lower cladding layer, a plurality of cores extending in a first direction, and an upper cladding layer in this order, and is provided with alignment marks located on the lower cladding layer. The lower cladding layer includes a first region in which the plurality of cores are located, and two second regions located facing the first region across a groove at positions between which the plurality of cores are sandwiched. The optical waveguide includes a first surface facing the mounting region, and end surfaces of the plurality of cores are exposed on the first surface. The alignment marks face each other across the groove and are located in the first region and the second regions of the lower cladding layer. The first surface of the optical waveguide is flush with second surfaces of the optical waveguide located in the first region and including end surfaces of the alignment marks facing the second regions.

An electronic component mounting structure according to the present disclosure includes the optical circuit board described above and an optical component.

A method for manufacturing an optical circuit board, according to the present disclosure, includes preparing a wiring board; layering a lower cladding layer, a plurality of cores, and an upper cladding layer covering at least the plurality of cores in this order over an upper surface of the wiring board, the lower cladding layer including a base portion in which the plurality of cores are located and projecting portions projecting from the base portion at positions between which the plurality of cores are sandwiched, and forming alignment mark members each straddling the base portion and a corresponding projecting portion of the lower cladding layer; and forming a linear groove dividing the alignment mark members and exposing end surfaces of the plurality of cores in the base portion.

DESCRIPTION OF EMBODIMENTS

As mentioned above, if the position where processing is performed by dicing is shifted, the positional accuracy of the optical component and the cores decreases. As a result, an optical loss between the optical component and the cores may increase. Therefore, there is a demand for an optical circuit board on which the optical component can be mounted with high accuracy.

For the optical circuit board of the present disclosure, the end surfaces of the alignment marks are used as a reference, which facilitates mounting the optical component on the optical circuit board in such a manner that the end surfaces of the plurality of cores are spaced at a predetermined interval from the light-emitting portion of the optical component. The optical circuit board of the present disclosure allows the optical component to be mounted thereon with high accuracy.

In the method for manufacturing the optical circuit board according to the present disclosure, a linear groove is formed to allow the end surfaces of the plurality of cores and the end surfaces of the alignment marks to be located at the same position in the core extending direction. Accordingly, the end surfaces of the alignment marks are used as a reference, which facilitates mounting the optical component on the optical circuit board in such a manner that the end surfaces of the plurality of cores are spaced at a predetermined interval from the light-emitting portion of the optical component. Therefore, the method for manufacturing the optical circuit board according to the present disclosure can provide the optical circuit board on which the optical component can be mounted with high accuracy.

Figure 1:
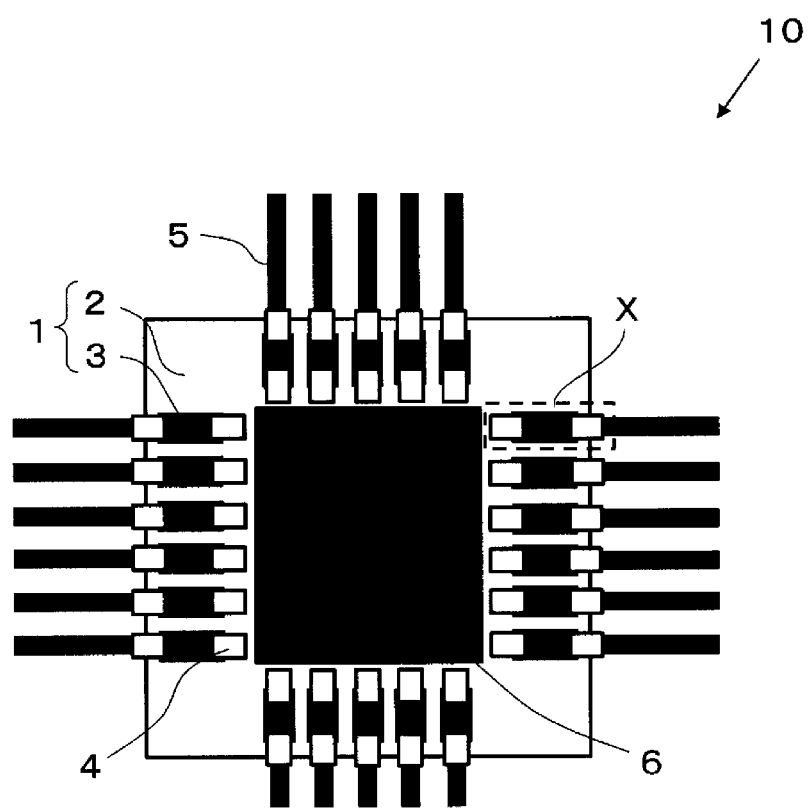
FIG. 1 is a plan view illustrating an electronic component mounting structure in which a silicon photonics device and an electronic component are mounted on an optical circuit board according to an embodiment of the present disclosure.

An optical circuit board according to an embodiment of the present disclosure will be described with reference to FIGS. 1 and 2. FIG. 1 is a plan view illustrating an electronic component mounting structure 10 in which an optical component 4 is mounted on an optical circuit board 1 according to an embodiment of the present disclosure.

The optical circuit board 1 according to the embodiment of the present disclosure includes a wiring board 2 and an optical waveguide 3. Examples of the wiring board 2 included in the optical circuit board 1 according to the embodiment include a wiring board typically used in optical circuit boards.

Although not specifically illustrated, such a wiring board 2 includes, for example, a core substrate and build-up layers layered on both surfaces of the core substrate. The core substrate is not particularly limited as long as the core substrate is made of a material having an insulating property. Examples of a material having an insulating property include resins such as an epoxy resin, a bismaleimide-triazine resin, a polyimide resin, and a polyphenylene ether resin. Two or more of these resins may be mixed and used. The core substrate usually includes a through hole conductor for electrically connecting the upper and lower surfaces of the core substrate.

The core substrate may contain a reinforcing material. Examples of the reinforcing material include insulation fabric materials such as glass fiber, glass non-woven fabric, aramid non-woven fabric, aramid fiber, and polyester fiber. Two or more types of reinforcing materials may be used in combination. Inorganic filler made of, for example, silica, barium sulfate, talc, clay, glass, calcium carbonate, titanium oxide, or the like may be dispersed in the core substrate.

The build-up layers have a structure in which insulating layers and conductor layers are alternately layered. Part of the outermost conductor layer includes a first conductor layer 21a on which the optical waveguide 3 is located. The insulating layers included in the build-up layers are not limited to any particular material as long as the insulating layers are made of a material having an insulating property like the core substrate. Examples of a material having an insulating property include resins such as an epoxy resin, a bismaleimide-triazine resin, a polyimide resin, and a polyphenylene ether resin. Two or more of these resins may be mixed and used. When two or more insulating layers are present in the build-up layers, the insulating layers may be made of the same resin or may be made of different resins. The insulating layers included in the build-up layers and the core substrate may be made of the same resin or may be made of different resins. Each of the build-up layers usually includes a via hole conductor for electrically connecting the layers.

Inorganic filler made of, for example, silica, barium sulfate, talc, clay, glass, calcium carbonate, or titanium oxide may be dispersed in the insulating layers included in the build-up layers.

The wiring board 2 may include solder resists on parts of both surfaces. The solder resists are made of, for example, an acryl-modified epoxy resin.

Figure 2A:
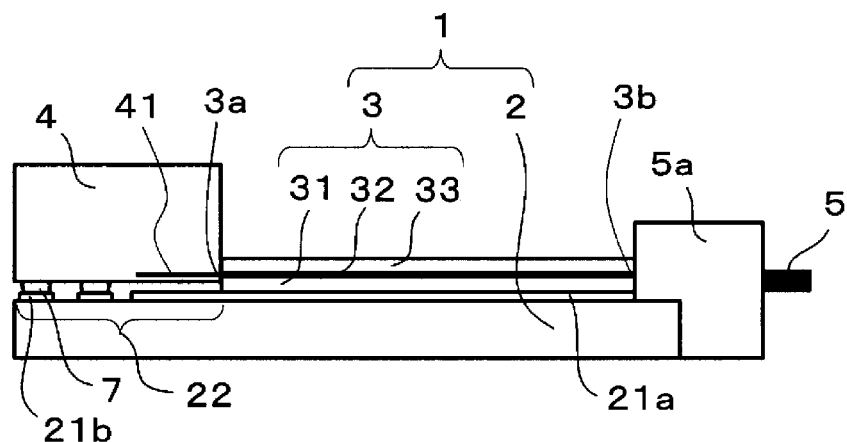
FIG. 2A is an enlarged explanatory diagram for explaining a cross section of a region X illustrated in FIG. 1.

The optical waveguide 3 included in the optical circuit board 1 according to the embodiment is located on a surface of the conductor layer 21a formed on an upper surface (one main surface) of the wiring board 2. The conductor layer 21a is a metal layer made of a metal such as copper, for example. With the metal layer formed on one main surface of the wiring board 2, the resin portion of the wiring board 2 is less likely to be damaged during dicing. As illustrated in FIG. 2A, the optical waveguide 3 has a structure in which a lower cladding layer 31, cores 32, and an upper cladding layer 33 are layered in this order from the first conductor layer 21a side. FIG. 2A is an enlarged explanatory diagram illustrating a cross section of the region X illustrated in FIG. 1. For convenience of explanation, the upper surface refers to a surface on the upper side of the drawing of the two surfaces having relatively large areas of the wiring board 2.

The lower cladding layer 31 included in the optical waveguide 3 is located over the surface of the wiring board 2, specifically on the surface of the first conductor layer 21a formed on the surface of the wiring board 2. The material of the lower cladding layer 31 is not limited, and examples thereof include, for example, an epoxy resin, a silicone resin, and the like.

Figure 2B:
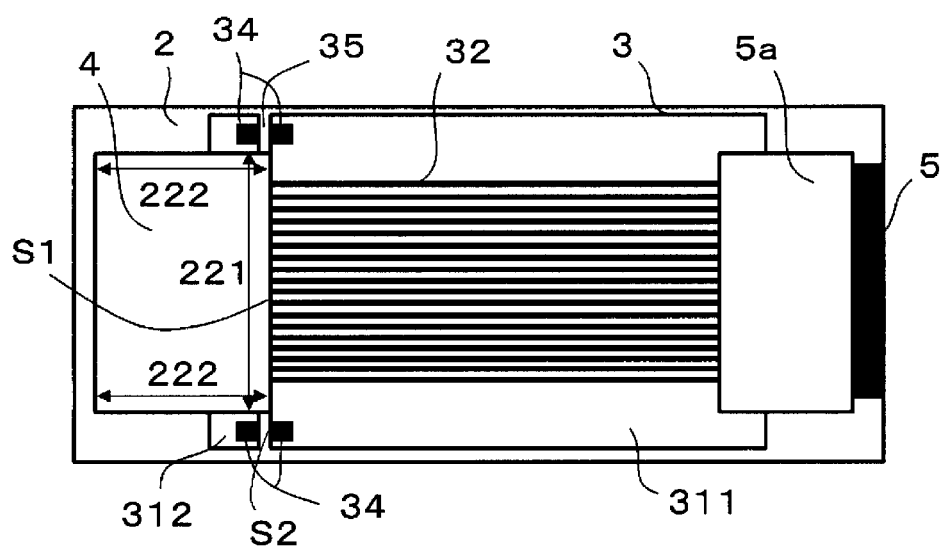
FIG. 2B is a plan view of the region X illustrated in FIG. 1 (excluding an upper cladding layer of the optical waveguide).

The lower cladding layer 31 includes a first region 311 located along a first side 221 of the mounting region 22, and two second regions 312 located along second sides 222 of the mounting region 22 at positions facing the first region 311 across a linear groove 35. The lower cladding layer 31 may be continuous at the bottom of the groove 35, but when divided into the first region 311 and the second region 312, the lower cladding layer 31 is less likely to interfere with mounting of the optical component 4. As illustrated in FIG. 2B, the first side 221 of the mounting region 22 is a side extending in a direction substantially orthogonal to the extending direction (first direction) of the cores 32 in a plan view. The second sides 222 of the mounting region 22 are two sides connected to both ends of the first side 221 and are substantially parallel to the extending direction of the cores 32 in a plan view.

The upper cladding layer 33 included in the optical waveguide 3 is also made of the same material as or a material similar to that of the lower cladding layer 31. The upper cladding layer 33 is located in the first region 311 of the lower cladding layer 31 so as to cover portions other than the end surfaces (first end surfaces 3a and second end surfaces 3b) of the cores 32 and the portions facing the second region 312. The lower cladding layer 31 and the upper cladding layer 33 may be made of the same material or may be made of different materials, but desirably have comparable indices of refraction. The lower cladding layer 31 and the upper cladding layer 33 may have the same thickness or may have different thicknesses. For example, the lower cladding layer 31 and the upper cladding layer 33 each have a thickness of approximately from 5 μm to 100 μm.

The core 32 included in the optical waveguide 3 is a portion through which light that has entered the optical waveguide 3 propagates. The material of the cores 32 is not limited, and is appropriately set in consideration of, for example, the light transmissivity, the wavelength characteristics of the light, and the like. Examples of the material include an epoxy resin and a silicone resin. For example, the cores 32 each have a thickness of approximately from 5 μm to 50 μm.

As illustrated in FIG. 2B, one optical waveguide 3 includes a plurality of cores 32. FIG. 2B is a plan view of the region X illustrated in FIG. 1 (excluding the upper cladding layer 33 of the optical waveguide). The cores 32 are located in the first region 311 of the lower cladding layer 31, and the first end surfaces 3a of the cores 32 are exposed on a first surface S1 of the optical waveguide 3 facing the mounting region 22. That is, the cores 32 are located facing the light-emitting portion included in the optical component 4 at the first end surfaces 3a which are in the same plane as the first surface S1. At the first end surfaces 3a, optical signals are transmitted and received between the cores 32 and the light-emitting portion. When the optical component 4 is a silicon photonics device, the cores 32 are located facing a silicon waveguide (Si waveguide) 41 included in the silicon photonics device at the first end surface 3a. At the first end surfaces 3a, the optical signals are transmitted and received between the cores 32 and the Si waveguide 41.

In the lower cladding layer 31, alignment marks 34 are located at portions not covered with the upper cladding layer 33, that is, at portions where the first region 311 and the second region 312 face each other. The alignment marks 34 are located in the first region 311 and the second region 312 so as to face each other across the groove 35. The end surfaces of the alignment marks 34 located in the first region 311 and facing the second region 312 are in the same plane as a second surface S2 facing the second region 312 of the optical waveguide 3. In other words, the end surfaces of the alignment marks 34 located in the first region 311 and facing the second region 312 are in the same plane as the side surface (second surface S2) of the lower cladding layer 31 facing the second region 312. The first surface S1 on which the end surfaces (first end surfaces 3a) of the plurality of cores 32 are exposed is flush with the second surface S2 located in the first region 311 and including the end surfaces of the alignment marks 34 facing the second region 312. Therefore, in the first direction in which the cores 32 extend, the end surfaces (first end surfaces 3a) of the plurality of cores 32 and the end surfaces of the alignment marks 34 located in the first region 311 and facing the second region 312 are located at the same position. Accordingly, the use of the end surfaces of the alignment marks 34 located in the first region 311 and facing the second region 312 as a reference facilitates mounting the optical component 4 in such a manner that the end surfaces (first end surfaces 3a) of the plurality of cores 32 are spaced at a predetermined interval from the light-emitting portion of the optical component 4. The optical circuit board of the present disclosure allows the optical component to be mounted thereon with high accuracy.

A material of the alignment marks 34 is not limited, but needs to be a visible material. Examples of such a material include, for example, an epoxy resin and a silicone resin. The alignment marks 34 may be made of, for example, the same material as that for the cores 32.

A method for manufacturing the optical circuit board according to the present disclosure is not particularly limited. The method for manufacturing the optical circuit board according to the present disclosure includes steps (a) to (c) below, for example. The manufacturing method according to an embodiment will be described. The same reference signs denote the same members as those illustrated in FIGS. 1 and 2, and detailed description thereof will be omitted.

(a) Preparing a wiring board.
(b) Layering, over the upper surface, the lower cladding layer, the plurality of cores, and the upper cladding layer covering at least the plurality of cores in this order, the lower cladding layer including a base portion in which the plurality of cores are located and projecting portions projecting from the base portion at positions between which the plurality of cores are sandwiched, and forming alignment mark members each straddling the base portion and a corresponding one of the projecting portions of the lower cladding layer.
(c) Forming a linear groove such that the alignment mark members are divided and the end surfaces of the plurality of cores are exposed in the base portion.

In step (a), the wiring board 2 is prepared. The wiring board 2 is not limited, but needs to include the mounting region 22 having a first side 221 and two second sides 222 connected to both ends of the first side 221 substantially orthogonally on the upper surface (one main surface). A conductor layer 21a may be formed on the upper surface of the wiring board 2. The conductor layer 21a is a metal layer made of a metal such as copper, for example. For convenience of explanation, the upper surface refers to a surface on the upper side of the drawing of the two surfaces having relatively large areas of the wiring board 2.

Figure 3A:
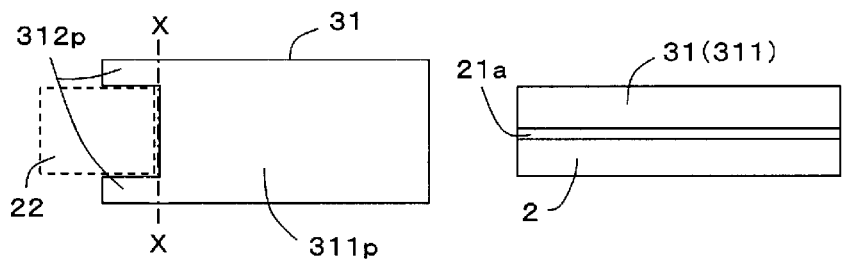
FIGS. 3A-3D are an explanatory diagram for explaining an embodiment of a method for manufacturing an optical circuit board according to the present disclosure, in which left-hand side views are explanatory plan views, and right-hand side views are explanatory cross-sectional views taken along line X-X of the left-hand side views.

Subsequently, in step (b), the lower cladding layer, the plurality of cores, and the upper cladding layer covering at least the plurality of cores are layered in this order, and the alignment members are also formed over the upper surface of the wiring board 2 prepared in step (a). As illustrated in FIG. 3A, the lower cladding layer 31 is formed including a base portion 311p located on the side opposite to the mounting region 22 and along the first side 221 of the mounting region 22, and two projecting portions 312p located along the second sides 222. The lower cladding layer 31 is formed by, for example, bonding a sheet made of a photosensitive resin to the wiring board 2, and exposing and developing the sheet.

Figure 3B:
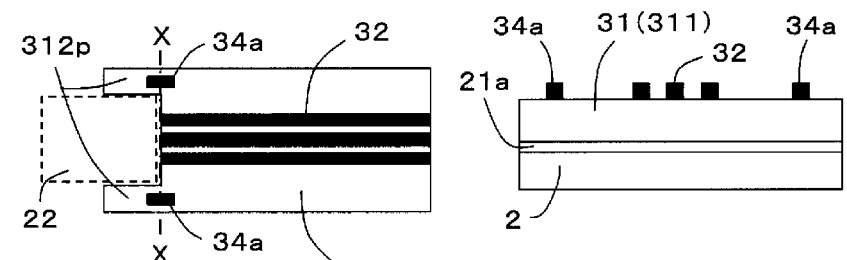

Subsequently, as illustrated in FIG. 3B, the plurality of cores 32 each including two end surfaces are formed on the base portion 311p of the lower cladding layer 31. The cores 32 are formed by, for example, bonding a sheet made of a photosensitive resin to the base portion 311p of the lower cladding layer 31, and exposing and developing the sheet. Then, on the upper surface of the lower cladding layer 31, two alignment mark members 34a each straddling the base portion 311p and a corresponding one of the projecting portions 312p are formed. The alignment mark members 34a are formed by, for example, bonding a sheet made of a photosensitive resin such that it straddles the base portion 311p and the projecting portions 312p of the lower cladding layer 31, and exposing and developing the sheet.

The cores 32 and the alignment mark members 34a may be made of the same member, or may be made of the same member in the same process steps simultaneously. Specifically, the alignment mark members 34a may be formed of a sheet made of the same photosensitive material as that for the cores 32. The alignment mark members 34a may also be formed of a sheet made of the same photosensitive material as that for the cores 32 when the cores 32 are formed. Forming the cores 32 and the alignment mark members 34a simultaneously in the same process step can eliminate errors between the process steps and improve the accuracy of the positional relationship between the cores 32 and the alignment marks 34. Furthermore, the number of cycles of bonding, exposing, and developing the sheet made of the photosensitive resin can be reduced by one cycle.

Figure 3C:
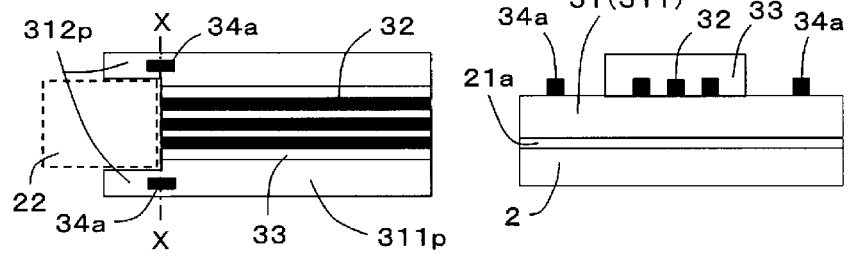

Subsequently, the upper cladding layer 33 is formed on the base portion 311p of the lower cladding layer 31 so as to cover the cores 32. As illustrated in FIG. 3C, the upper cladding layer 33 is formed so as not to cover the alignment mark members 34a, that is, so as not to cover portions facing the second regions 312. The upper cladding layer 33 is formed by, for example, bonding a sheet made of a photosensitive resin so as to cover the cores 32, and exposing and developing the sheet.

Figure 3D:
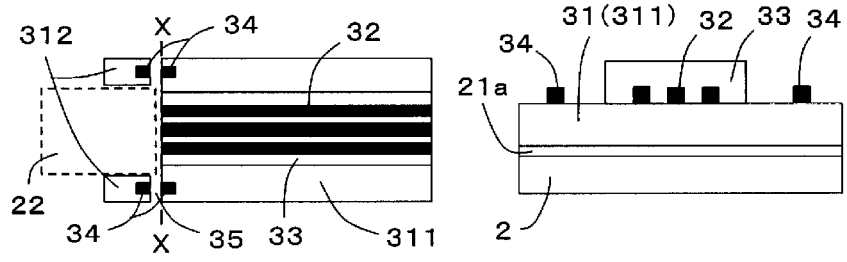

Finally, in step (c), the linear groove 35 is formed along the first side 221 of the mounting region 22 to cut the end portions of the plurality of cores 32 and form one end surfaces (first end surfaces 3a) of the cores facing the mounting region 22. Forming the linear groove 35 also divides the alignment mark members 34a each formed so as to straddle the base portion 311p and a corresponding one of the projecting portions 312p of the lower cladding layer 31, as illustrated in FIG. 3D. The base portion 311p and the projecting portions 312p are divided into the first region 311 and the second regions 312, and the alignment marks 34 are formed in both regions. The cutting is carried out by, for example, dicing.

In such a manufacturing method according to the embodiment, the alignment marks 34 are formed by forming the linear groove 35 to cut the alignment mark members 34a each formed so as to straddle the base portion 311p and the corresponding one of the projecting portions 312p of the lower cladding layer 31. Thus, in the extending direction of the plurality of cores 32, the end surfaces (first end surfaces 3a) of the cores 32 and the end surfaces of the alignment marks 34 located in the first region 311 and facing the second region 312 can be formed at the same position. Accordingly, the use of the end surfaces of the alignment marks 34 as a reference facilitates mounting in such a manner that the end surfaces of the plurality of cores 32 are spaced at a predetermined interval from the light-emitting portion of the optical component 4. The manufacturing method according to the embodiment can provide the optical circuit board on which the optical component can be mounted with high accuracy.

An electronic component mounting structure of the present disclosure will be described. The electronic component mounting structure 10 according to an embodiment of the present disclosure has a structure in which the optical component 4 and an electronic component 6 are mounted on the optical circuit board 1 according to an embodiment. Examples of the electronic component 6 include an application specific integrated circuit (ASIC) and a driver IC.

As illustrated in FIG. 2A, the optical component 4 is electrically connected via solder 7 to an electrode 21b located in the mounting region 22 of the wiring board 2. Examples of the optical component 4 include, for example, a silicon photonics device.

Among the examples, the silicon photonics device is a type of optical waveguides including, for example, a core made of silicon (Si) and a cladding made of silicon dioxide ($SiO_2$). The silicon photonics device includes the Si waveguide 41, as described above, and further includes a passivation film, a light source portion, a photodetection portion, which are not illustrated, and the like. As described above, the Si waveguide 41 is located facing the cores 32 included in the optical waveguide 3 at the first end surfaces 3a of the cores 32.

For example, an electrical signal from the wiring board 2 propagates to the light source unit included in the optical component 4 via the solder 7. The light source unit emits light upon receiving the electrical signal thus propagated. The optical signal of the emitted light propagates to an optical fiber 5 connected via an optical connector 5a through the Si waveguide 41 and the cores 32 of the optical waveguide 3 which are used for signal propagation.

REFERENCE SIGNS

1 Optical circuit board
2 Wiring board
21a Conductor layer
21b Electrode
22 Mounting region
221 First side
222 Second side
3 Optical waveguide
31 Lower cladding layer
311 First region
311p Base portion
312 Second region
312p Projecting portion
32 Core
33 Upper cladding layer
34 Alignment mark
34a Alignment mark member
35 Groove
3a First end surface
3b Second end surface
4 Optical component (silicon photonics device)
41 Silicon waveguide (Si waveguide)
5 Optical fiber
5a Optical connector
6 Electronic component
7 Solder
10 Electronic component mounting structure
S1 First surface
S2 Second surface

The invention claimed is:

1. An optical circuit board comprising:
a wiring board comprising an upper surface; and
an optical waveguide located over the upper surface, wherein
the wiring board comprises a mounting region for an optical component on the upper surface,
the optical waveguide is located in a region adjacent to the mounting region, comprises, over the upper surface, a lower cladding layer, a plurality of cores extending in a first direction, and an upper cladding layer in this order, and is provided with alignment marks located on the lower cladding layer,
the lower cladding layer comprises a first region in which the plurality of cores are located, and two second regions located facing the first region across a groove, at positions between which the plurality of cores are sandwiched,
the optical waveguide comprises a first surface facing the mounting region, and end surfaces of the plurality of cores are exposed on the first surface,
the alignment marks face each other across the groove and are located in the first region and the second regions of the lower cladding layer, and
the first surface of the optical waveguide is flush with second surfaces of the optical waveguide located in the first region and comprising end surfaces of the alignment marks facing the second regions.

2. The optical circuit board according to claim 1, wherein the optical waveguide is located on an upper surface of a metal layer located on a surface of the wiring board.

3. The optical circuit board according to claim 1, wherein the cores and the alignment marks are made of an identical material.

4. An electronic component mounting structure, comprising:
the optical circuit board according to claim 1 and an optical component.

5. The electronic component mounting structure according to claim 4, wherein
the optical component is a silicon photonics device comprising a silicon waveguide, and
the silicon waveguide is located facing the cores of the optical waveguide of the optical circuit board.

6. A method for manufacturing an optical circuit board, comprising:
preparing a wiring board;
layering a lower cladding layer, a plurality of cores, and an upper cladding layer covering at least the plurality of cores in this order over an upper surface of the wiring board, the lower cladding layer comprising a base portion in which the plurality of cores are located and projecting portions projecting from the base portion at positions between which the plurality of cores are sandwiched, and forming alignment mark members each straddling the base portion and a corresponding projecting portion of the lower cladding layer; and forming a linear groove dividing the alignment mark members and exposing end surfaces of the plurality of cores in the base portion.

7. The method for manufacturing the optical circuit board, according to claim 6, wherein the cores and the alignment mark members are made of an identical material.

\* \* \* \* \*